United States Patent [19]

Nudelman et al.

[11] 3,860,581
[45] Jan. 14, 1975

[54] PREPARATION OF 1,4-BENZODIAZEPINES

[75] Inventors: Abraham Nudelman, Bala Cynwyd;
Ronald J. McCaully, Malvern;
Stanley C. Bell, Penn Valley, all of Pa.

[73] Assignee: American Home Products Corporation, New York, N.Y.

[22] Filed: Dec. 27, 1972

[21] Appl. No.: 318,817

[52] U.S. Cl........ 260/239.3 D, 424/244, 260/268 R
[51] Int. Cl............................................ C07d 53/06
[58] Field of Search............................. 260/239.3 D

[56] References Cited
UNITED STATES PATENTS

| | | | |
|---|---|---|---|
| 3,296,249 | 1/1967 | Bell............. | 260/239.3 D |
| 3,445,458 | 5/1969 | Bell............. | 260/239.3 D |
| 3,644,419 | 2/1972 | Metlesics et al............ | 260/239.3 D |

Primary Examiner—Henry R. Jiles
Assistant Examiner—Robert T. Bond
Attorney, Agent, or Firm—Vito Victor Bellino; Stephen Venetianer

[57] ABSTRACT

A method for the preparation of water soluble salts of 1,4-benzodiazepines is described herein. These compounds are prepared by reacting compounds having the following formula:

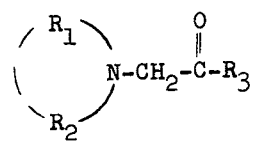

wherein $R_1$ is selected from the group consisting of (lower) alkyl and aryl (lower) alkyl; $R_2$ is di(lower)alkylamino(lower)alkyl; $R_1$ and $R_2$ may be concatenated to form a radical selected from the group consisting of

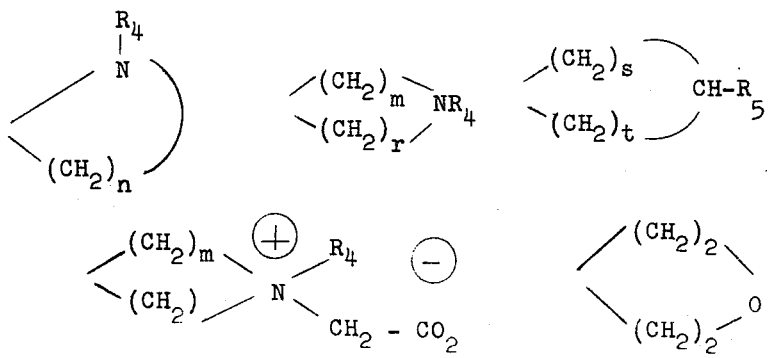

wherein $R_4$ is selected from the group consisting of (lower) alkylaryl, (lower) alkyl and (lower) alkoxy (lower) alkyl; $R_5$ is selected from the group consisting of (lower) dialkylamino and piperidino; $n$ is an integer from 3 to 5; $m$ is an integer from 1 to 2; $r$ is an integer from 2 to 3; $s$ is an integer from 0 to 6; $t$ is an integer from 0 to 6; with the proviso that the sum of $s$ and $t$ is 3 to 6 and $R_3$ is a carbonyl activating group with a compound having the following formula:

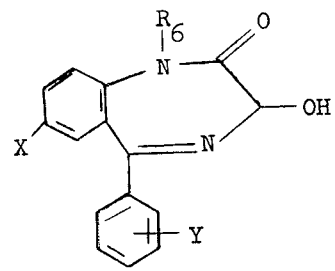

wherein $R_6$ is selected from the group consisting of hydrogen, (lower) alkyl, aryl (lower) alkyl and (lower) alkoxy (lower) alkyl; X is selected from the group consisting of halogen, cyano, trifluoromethyl, nitro and (lower) alkylthio; Y is selected from the group consisting of hydrogen, halogen, trifluoromethyl, nitro and (lower) alkylthio. The 1,4-benzodiazepines which can be converted to water soluble salts have the following formula:

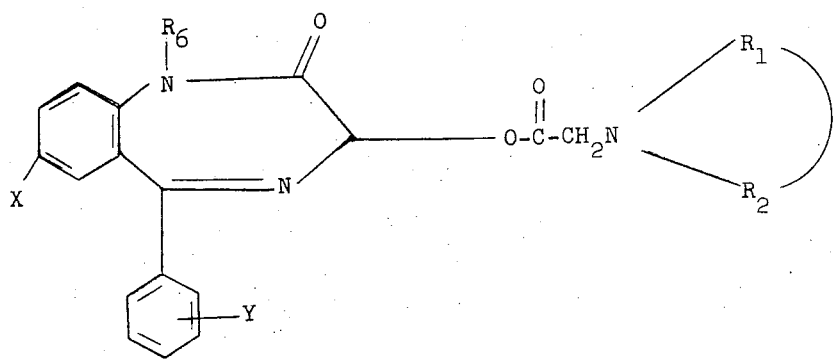
wherein $R_1$, $R_2$, $R_6$, X and Y have the same significance as herein above described.
10 Claims, No Drawings

PREPARATION OF 1,4-BENZODIAZEPINES

BACKGROUND OF THE INVENTION

1. Field of the Invention

This invention relates to the synthesis of water soluble salts of 1,4-benzodiazepines. More specifically, the synthesis comprises reacting a compound having the formula:

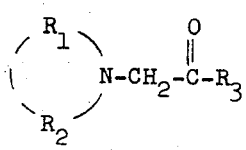

wherein $R_1$ is selected from the group consisting of (lower) alkyl and aryl (lower) alkyl; $R_2$ is di(lower)alkylamino(lower)alkyl; $R_1$ and $R_2$ may be concatenated to form a radical selected from the group consisting of

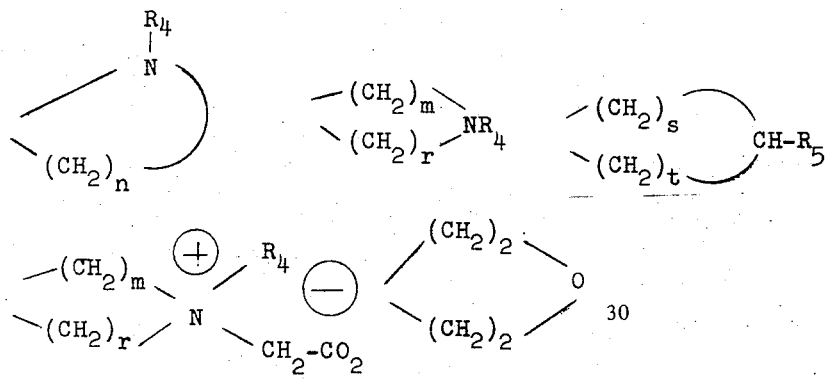

wherein $R_4$ is selected from the group consisting of (lower) alkylaryl, (lower) alkyl and (lower) alkoxy (lower) alkyl; $R_5$ is selected from the group consisting of (lower) dialkylamino and piperidino; $n$ is an integer from 3 to 5; $m$ is an integer from 1 to 2; $r$ is an integer from 2 to 3; $s$ is an integer from 0 to 6; $t$ is an integer from 0 to 6; with the proviso that the sum of $s$ and $t$ is 3 to 6 and $R_3$ is a carbonyl activating group with a 1,3-dihydro-3-hydroxy-5-phenyl-2H-1,4-benzodiazepin-2-one under specified reaction conditions in order to form the desired 1,4-benzodiazepine. This product can then be converted to a salt which is water soluble.

2. Description of the Prior Art

The prior art contains two basic reaction paths for the synthesis of esters of 3-hydroxy 1,4-benzodiazepines. They can be represented by the following schematic diagram:

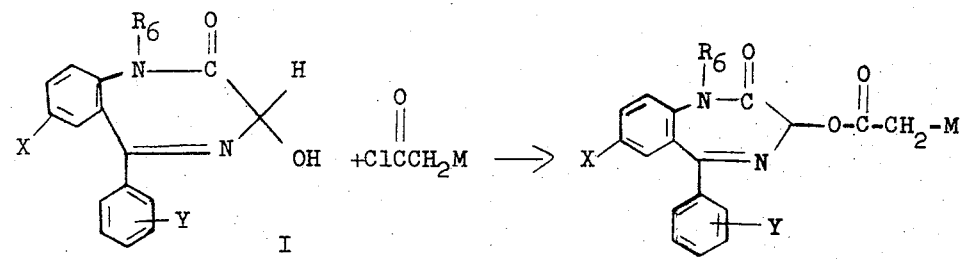

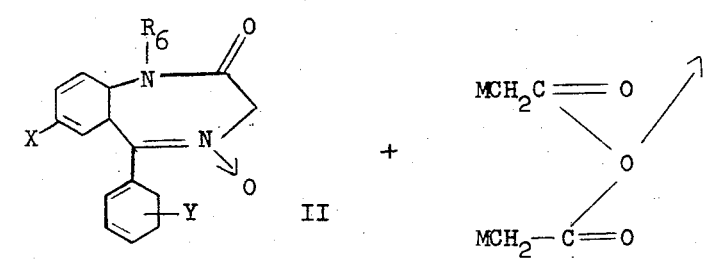

Wherein M is halogen. U.S. Pat. No. 3,296,249 discloses these prior art reaction paths. As can be seen both these schemes involve intermediate compounds represented by formula III. In order to form the desired 1,4-benzodiazepine compound III is reacted with an appropriately substituted amine. The prior art method suffers from the fact that intermediate compound III can be attacked by primary and secondary amines to produce compound I and in certain instances this side reaction reduces the efficiency of these methods. Additionally, compound I will isomerize in the presence of certain strong bases of the type employed in the previously described prior art to the following compound:

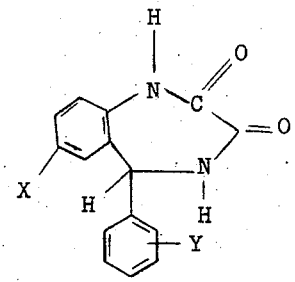

The above side reactions are overcome by the process of this invention described herein.

SUMMARY OF THE INVENTION

This invention provides a method for the synthesis of 1,4-benzodiazepines whose salts are water soluble. The process comprises reacting compounds represented by the formula:

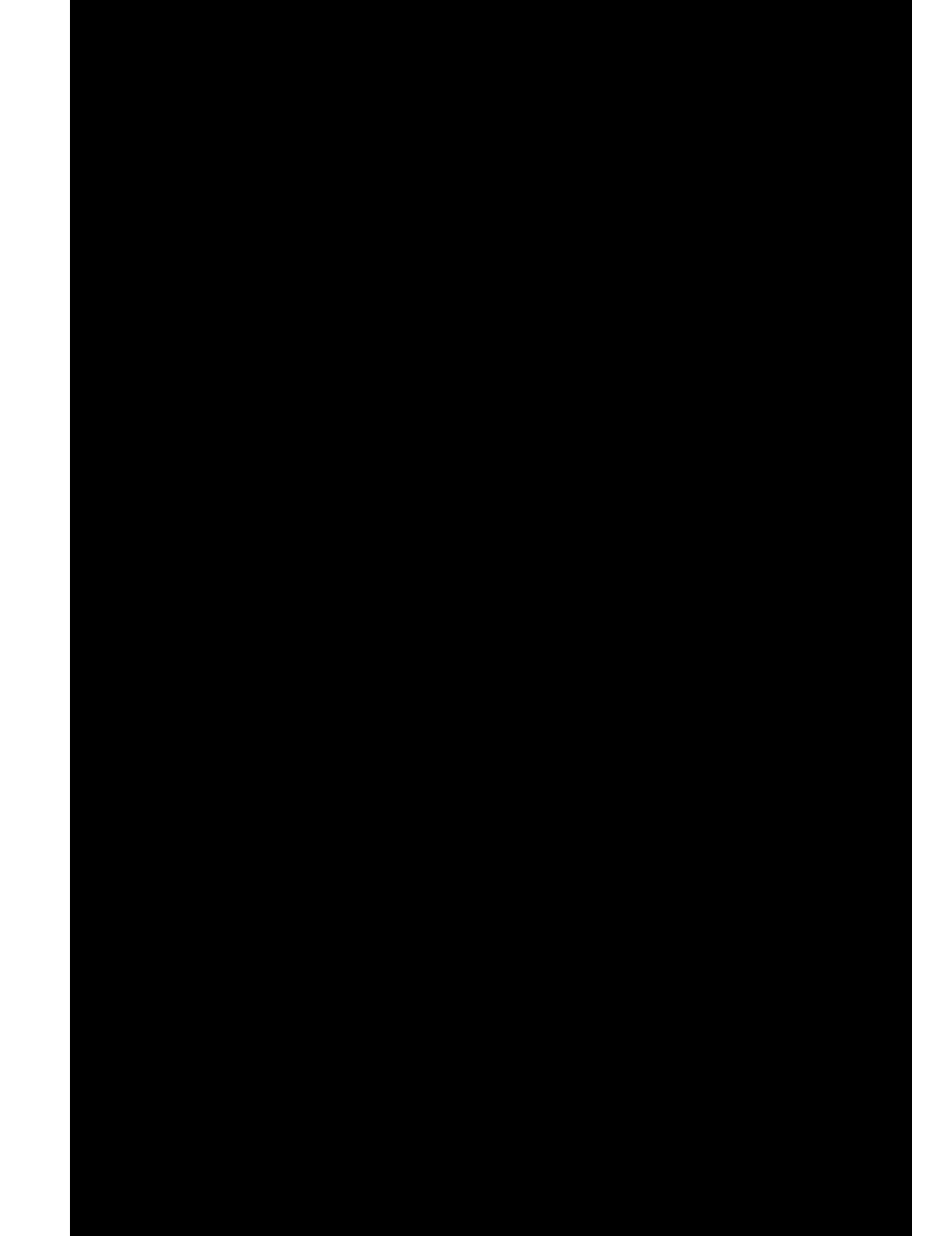

1,4-Benzodiazepines are prepared by combining molar quantities of the appropriate 1,3-dihydro-3-hydroxy-5-phenyl-2H-1,4-benzodiazepin-2-one with the appropriately substituted activated amino acid in a non-reactive organic solvent that is capable of dissolving the reactants. Suitable examples include 1,2-dimethoxyethane, dioxane and tetrahydrofuran. The reaction is preferable carried out at about 25° to about 80°C. for about 0.5 to about 100 hours. The reaction solvent is evaporated and the residue is dissolved in a water immiscible organic solvent and is extracted with water.

The organic phase is separated, dried, concentrated and added to a vigorously stirred solution of the appropriate strong acid in ether or other suitable solvents. The compounds of the invention may be filtered and recrystallized from the appropriate solvent.

These benzodiazepines are pharmacologically active as central nervous system depressants.

In the pharmacological evaluation of the biological activity of these benzodiazepines, the in vivo effects were tested as follows. The compound was administered orally or intraperitoneally to three mice (14 to 24 grams) at doses ranging from 0.04 to 400 milligrams per kilogram of host body weight (MPK). The animals were watched for a minimum of two hours during which time signs of general stimulation, (i.e., increased spontaneous motor activity, hyperactivity on tactile stimulation, twitching), general depression (i.e., decreased spontaneous motor activity, decreased respiration), autonomic activity (i.e., miosis, mydriasis, diarrhea) were noted.

The benzodiazepines have induced central nervous system depressant effects at dosages of 4.0 MPK per os and lower in the above mentioned host. Thus the benzodiazepines have demonstrated utility as pharmacologically active compounds in experimental and comparative pharmacology and are of value in the treatment of mammals, e.g., mice, rats, etc., who are responsive to treatment with central nervous system depressant agents. Specifically the compounds may be administered for the purpose of inducing a calming effect in mammals.

It is particularly important to note that the salts of the benzodiazepines prepared by the process of this invention are water soluble. This property is of special interest in preparing dosage formulations wherein a liquid vehicle is required.

When the benzodiazepines are employed as described above they may be administered alone in in combination with pharmacologically acceptable carriers, the proportion of which is determined by the chosen route of administration and standard pharmaceutical practice. For example, they may be administered orally in tablet or capsule form with conventional flavors, diluents, lubricants, disintegrators or binding agents as may be required. They may be administered orally in the form of a solution or they may be injected parenterally. For parenteral administration they may be used in the form of a sterile solution containing other solutes, for example, enough saline or glucose to make the solution isotonic. It is most advantageous to provide the compound as a dry powder in a suitable container so that it may be admixed with a suitable aqueous vehicle prior to administration.

A suitable tablet formulation is as follows:

| | | |
|---|---|---|
| 7-chloro-5-(o-chlorophenyl)-1,3-dihydro-3-hydroxy-2H-1,4-benzodiazepin-2-one, 4-methyl-1-piperazine-acetate, methanesulfonate hydrate | 5 | mg |
| Microcrystalline Cellulose, N.F. | 20 | mg |
| Magnesium Stearate, U.S.P | 0.25 | mg |
| Lactose, U.S.P. | 74.75 | mg |
| Total Table Weight | 100 | mg |

A suitable reconstitutable injectable formulation is as follows:

1. 7-chloro-5-(o-chlorophenyl)-1,3-dihydro-3-hydroxy-2H-1,4-benzodiazepin-2-one, 4-methyl-1-piperazineacetate, methanesulfonate hydrate ... 5 mg. (packaged with 95 mg. of lactose in a sealed glass ampoule)

2. Vehicle: sterile water for injection 5ml containing benzyl alcohol 1% and sodium acetate/acetic acid buffer 0.6%

The following examples are added to illustrate but not to necessarily limit the scope of the invention.

EXAMPLE 1

4-Methyl-1-piperazineacetic acid

A solution of N-methyl piperazine (15 g, 0.15 moles) and chloroacetic acid (4.7 g, 0.05 moles) in 50 ml of water is stirred for 18 hours. The solution is then placed on a column containing 300 g Dowex 1-X 8 resin in its basic form. The column is washed with distilled water until the pH of the eluent is neutral and is eluted with 10% hydrochloric acid. 900 ml of the acid eluent is collected and rechromatographed through a column containing 300 g of Dowex 50 W-X2 in its acidic form. The column is washed with distilled water until no more chloride ion is eluted (as indicated by the absence of a precipitate with silver nitrate) and is then eluted with 10% ammonium hydroxide until 600 ml of basic eluent is collected. The eluted solution when flash evaporated yields 3.7 g (46% yield) of crystalline product (recrystallize from methanol ether), m.p. 159.5°–161°. nmr (DMSO-$D_6$) ppm ( $\delta$ ), 2.25 (s,3), 2.5 (broad m,4), 2.7 (broad m, 4), 3.15 (s,2).

Anal. Calcd for $C_7H_{14}N_2O_2.1/4H_2O$:  C, 51.67; H, 8.97; N, 17.22.
Found:  C, 51.69; H, 8.98; N, 16.81.

EXAMPLE 2

1,4-Dicarboxymethyl-1-methylpiperazinium hydroxide inner salt and its sodium salt To a solution of chloroacetic acid (19 g, 0.02 moles) in 10 ml of water is added a solution of sodium hydroxide (8 g, 0.02 moles) in 10 ml of water. The solution is stirred for 0.5 hours, and N-methylpiperazine (10 g, 0.01 moles) is added. After stirring for 18 hours at room temperature, the solution is chromatographed on 900 g of Dowex 50 W-X 2 resin in its acidic form. The column is washed with distilled water until no more chloride ion is obtained as indicated by silver nitrate treatment. The column is then eluted with 3 N ammonium hydroxide until 1800 ml of basic eluent is collected. Flash evaporation yields a foam which when mixed with absolute ethanol and added to methylene chloride yields 9.2 (42% yield) of product as a white crystalline solid. Recrystallization from water-methanol affords pure product, mp. 306°–307°, nmr ($D_2O$) ppm ( $\beta$ ) 3.43 (s, 3), 3.7 (broad m, 4) superimposed at 3.8 (s, 2), 4 (broad m, 4) 4.12 (s, 2).

Anal. Calcd for $C_9H_{16}N_2O_4$:  C, 49.99; H, 7.46; N, 12.96.
Found:  C, 50.13; H, 7.64; N, 12.73.

Treatment of the above obtained 1,4-dicarboxymethyl-1-methylpiperazinium hydroxide inner salt with an equivalent amount of sodium hydroxide followed by recrystallization from watermethanol, yields the corresponding sodium salt, mp. 159°–162°, nmr (D₂O) ppm ( δ ) 3.1 (broad m, 4), 3.25 (s, 2), 3.35 (s, 2) 3.8 (broad m, 4) 4.0 (s, 2).

Anal. Calcd for C₉H₁₅N₂NaO₄.2H₂O:  C, 39.42; H, 6.98; N, 10.21.
Found:  C, 39.28; H, 7.06; N, 10.13.

EXAMPLE 3

7-Chloro-5-(o-chlorophenyl)-1,3-dihydro-3-hydroxy-2H-1,4-benzodiazepin-2-one, 4-methyl-1-piperazine acetate, dihydrochloride, from 4-methyl-1-piperazinacetic acid To a solution obtained by warming a mixture of 4-methyl-1-piperazineacetic acid (0.79 g, 5mmoles) and anhydrous dimethyl formamide (10 ml) is added 1,1-carbonyldiimidazole (0.81 g, 0.5 mmoles). A solution of 7-chloro-5-(o-chlorophenyl)-1, 3-dihydro-3-hydroxy-2H-1,4-benzodiazepin-2-one (1.6 g, 0.5 mmoles) in 50 ml of anhydrous tetrahydrofuran is added. After stirring at room temperature for 80 hours, the reaction mixture is flash evaporated to give an oil. The residue is mixed with ethyl acetate and is washed three times with 100 ml of water. The organic phase is dried and evaporated to give an oil which is then dissolved in methylene chloride (3 ml) and is added to a solution of gaseous hydrogen chloride in ether. A precipitate is obtained which when recrystallized from methanol-ether gives 1.2g (42% yield) of the desired hydrochloride, mp. 218°–220°, nmr (DMSO-D₆) ppm ( δ ) 2.80 (s, 3), 3.40 (broad s, 8), 4.23 (s, 2), 5.98 (s, 1), 6.96 (d, 1), 7.2–7.8 (m, 6).

Anal. Calcd for C₂₂H₂₂Cl₂N₀₃.2HCl.H₂O; C, 47.84; H, 4.75; N, 10.15.
Found: C, 47.51; H, 4.57; N, 9.85.

The following example illustrates the preparation of a water-soluble salt

EXAMPLE 4

7-Chloro-5-(o-chlorophenyl)-1,3-dihydro-3-hydroxy-2H-1,4-benzodiazepin-2-one, 4-methyl-1-piperazineacetate, methane sulfonate, hydrate To a solution of 7-chloro-5-(o-chlorophenyl)-1,3-dihydro-3-hydroxy-2H-1,4-benzodiazepin-2-one, 4-methyl-1-piperazineacetate (2.3 g., 5 millimoles) is added methane sulfonic acid (0.48 g., 5 millimoles). The solution is stirred at room temperature for 30 min. The solvent is then flash evaporated and the residue is recrystallized from methanol-ether to give 2.3 g. (80% yield) of white crystalline product which does not melt sharply but slowly decomposes above 160°, nmr (DMSO–D₆), ppm ( δ ), 2.42 (s, 3), 2.82 (s, 2), 3.0 (broad m, 4), 3.4 (broad m, 4), 3.65 (s, 2), 5.95 (s, 1), 7.05 (d, 1), 7.2–7.9 (m, 6).

Anal. Calcd. for C₂₂H₂₂Cl₂N₄O₃.CH₄SO₃.H₂O:
 C, 48.00; H, 4.90; N, 9.74; Cl, 12.32
Found: C, 48.08; H, 4.71; N, 9.41; Cl, 12.62

The methane sulfonate salt is soluble in water in amounts greater than 300 milligrams per milliliter at room temperature (25°C.)

EXAMPLE 5

7-Chloro-5-(o-chlorophenyl)-1,3-dihydro-3-hydroxy-2H-1,4-benzodiazepin-2-one, 4-morpholineacetate ester, hydrochloride The above compound is prepared by a similar procedure as described in Example 3 from 4-morpholineacetic acid, thionyl diimidazole, 7-chloro-5-(o-chlorophenyl)-1,3-dihydro-3-hydroxy-2H-1,4-benzodiazepin-2-one, and hydrogen chloride. The product obtained melts are 255°–257°C; NMR (DMSO-D₆) ppm ( δ ) 3.5 (broad s, 4); 4.0 (broad s, 4); 4.67 (s, 2); 6.17 (s, 1); 7.11 (d, 1); 7.5–8 (m, 6).

EXAMPLE 6

7-Chloro-5-(o-chlorophenyl)-1,3-dihydro-3-hydroxy-1-methyl-2H-1,4-benzodiazepin-2-one, 4-morpholine acetate, hydrochloride The above compound is prepared by a similar procedure as described in Example 3 from 4-morpholineacetic acid, bis(2,4-dinitrophenyl)carbonate, 7-chloro-5-(0-chlorophenyl)-1,3-dihydro-3-hydroxy-1-methyl-2H-1,4-benzodiazepin-2-one, and hydrogen chloride. The product obtained melts at 237°–238°; NMR (DMSO-D₆), ppm ( δ ), 3.52 (broad s, 7); 4.05 (broad s, 4); 4.75 (s, 2); 6.26 (s, 1); 7.27 (d, 1); 7.7–8 (m, 6).

EXAMPLE 7

7-Chloro-5-(o-chlorophenyl)-1,3-dihydro-3-hydroxy-1-methyl-2H-1,4-benzodiazepin-2-one, 4-methyl-1-piperazineacetate, methane, sulfonate The above compound is prepared by a similar procedure as described in Example 3, from 4-methyl-1-piperazineacetic acid, dicyclohexylcarbodiimide, 7-chloro-5-(o-chlorophenyl)-1,3-dihydro-3-hydroxy-1-methyl-2H-1,4-benzodiazepine-2-one, and methane sulfonic acid. The product obtained melts at 238°–240°C; NMR (DMSO-D₆), ppm ( δ ), 2.48 (s, 3), 2.87 (s, 3), 3 (broad m, 4), 3.3 (broad m, 4); 3.48 (s, 3); 3.68 (s, 2); 6.02 (s, 1); 7.10 (m, 1); 7.5–7.95 (m, 6).

EXAMPLE 8

7-Chloro-5-(o-chlorophenyl)-1,3-dihydro-3-hydroxy-2H-1,4-benzodiazepin-2-one, N-(2-dimethylaminoethyl)-N-methylglycinate, dihydrochloride The above compound is prepared by a similar procedure as described in Example 3 from N-(2-dimethylaminoethyl)-N-methylglycine, ethyl chloroformate, 7-chloro-5-(o-chlorophenyl)1,3-dihydro-3-hydroxy-2H-1,4-benzodiazepin-2-one and hydrogen chloride. The product obtained melts at 221°–223° C; NMR (DMSOD₆), ppm ( δ ), 2.95 (s, 6); 3.00 (s, 3); 3.65 (broad s, 4); 4.52 (broad s, 2); 6.10 (s, 1); 7.02 (d, 1); 7.4–7.8 (m, 6).

What is claimed is:

1. A method for synthesizing the compound having the following formula

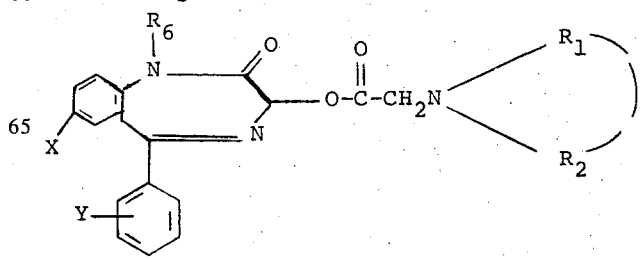

wherein R₁ is selected from the group consisting of (lower) alkyl and aryl (lower) alkyl wherein the aryl portion is selected from phenyl and naphthyl; R₂ is di(lower)alkylamino(lower)alkyl; R₁ and R₂ may be concatenated to form a radical selected from the group consisting of

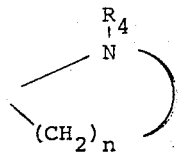 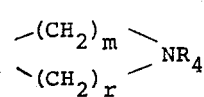 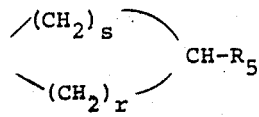

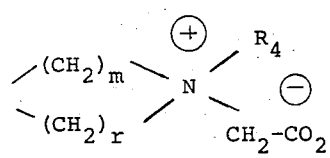 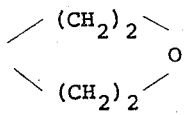

wherein R₄ is selected from the group consisting of (lower) alkylaryl wherein the aryl portion is phenyl or naphthyl, (lower) alkyl and (lower) alkoxy (lower) alkyl; R₅ is selected from the group consisting of (lower) dialkylamino and piperidino; R₆ is selected from the group consisting of hydrogen, (lower) alkyl, aryl (lower) alkyl wherein the aryl portion is phenyl or naphthyl and (lower) alkoxy (lower) alkyl; n is an integer from 3 to 5; m is an integer from 1 to 2; r is an integer from 2 to 3; s is an integer from 0 to 6; t is an integer from 0 to 6; with the proviso that the sum of s and t is 3 to 6; by reacting a compound having the following formula

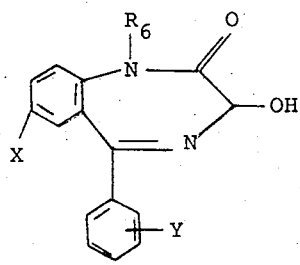

wherein X is selected from the group consisting of halogen, cyano, trifluoromethyl, nitro and (lower) alkylthio and Y is selected from the group consisting of hydrogen, halogen, trifluoromethyl, nitro and (lower) alkylthio with a solution of the following compounds:

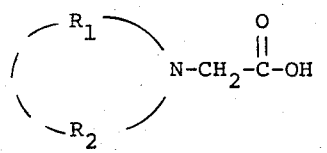

wherein R₁ and R₂ have the same significance as herein described above; and a compound selected from the group consisting of 1,1-carbonyldiimadazole, thionyldiimidazole, bis-(2,4dinitrophenyl)carbonate, dicyclohexylcarbodiimide and ethylchloroformate at a temperature of about 25°C to about 80°C in a suitable solvent.

2. A method according to claim 1 wherein the synthesized compound is reacted with a pharmaceutically acceptable acid to form a pharmaceutically acceptable salt.

3. A method according to claim 2 wherein the pharmaceutically acceptable acid is methane sulfonic.

4. A method according to claim 2 wherein the pharmaceutically acceptable acid is hydrochloric.

5. A method according to claim 2 wherein the pharmaceutically acceptable salt is 7-chloro-5-(o-chlorophenyl)1,3-dihydro-3-hydroxy-2H-1,4-benzodiazepin-2-one, 4 methyl-1-piperazine acetate, dihydrochloride.

6. A method according to claim 2 wherein the pharmaceutically acceptable salt is 7-chloro-5-(o-chlorophenyl)1,3-dihydro-3-hydroxy-2H-1,4-benzodiazepin-2-one, 4 methyl-1-piperazine acetate, methane sulfonate, hydrate.

7. A method according to claim 2 wherein the pharmaceutically acceptable salt is 7-Chloro-5-(o-chlorophenyl)1,3-dihydro-3-hydroxy-2H-1,4-benzodiazepin-2-one, 4-morpholine acetate ester, hydrochloride.

8. A method according to claim 2 wherein the pharmaceutically acceptable salt is 7-Chloro-5-(o-chlorophenyl)1,3-dihydro-3-hydroxy-1-methyl -2H-1,4-benzodiazepin-2-one, 4-morpholine acetate, hydrochloride.

9. A method according to claim 2 wherein the pharmaceutically acceptable salt is 7-Chloro-5-(o-chlorophenyl)1,3-dihydro-3-hydroxy-1-methyl-2H-1,4-benzodiazepin-2-one, 4-methyl-1-piperazineacetate, methane sulfonate.

10. A method according to claim 2 wherein the pharmaceutically acceptable salt is 7-Chloro-5-(o-chlorophenyl)1,3-dihydro-3-hydroxy-2H-1,4-benzodiazepin-2-one, N-(2-dimethylaminoethyl)-N-methylglycinate, dihydrochloride.

* * * * *